June 21, 1955 S. G. ESKIN 2,711,458
THERMOSTATICALLY OPERATED SHUT-OFF MEANS
Filed Aug. 3, 1953 3 Sheets-Sheet 1
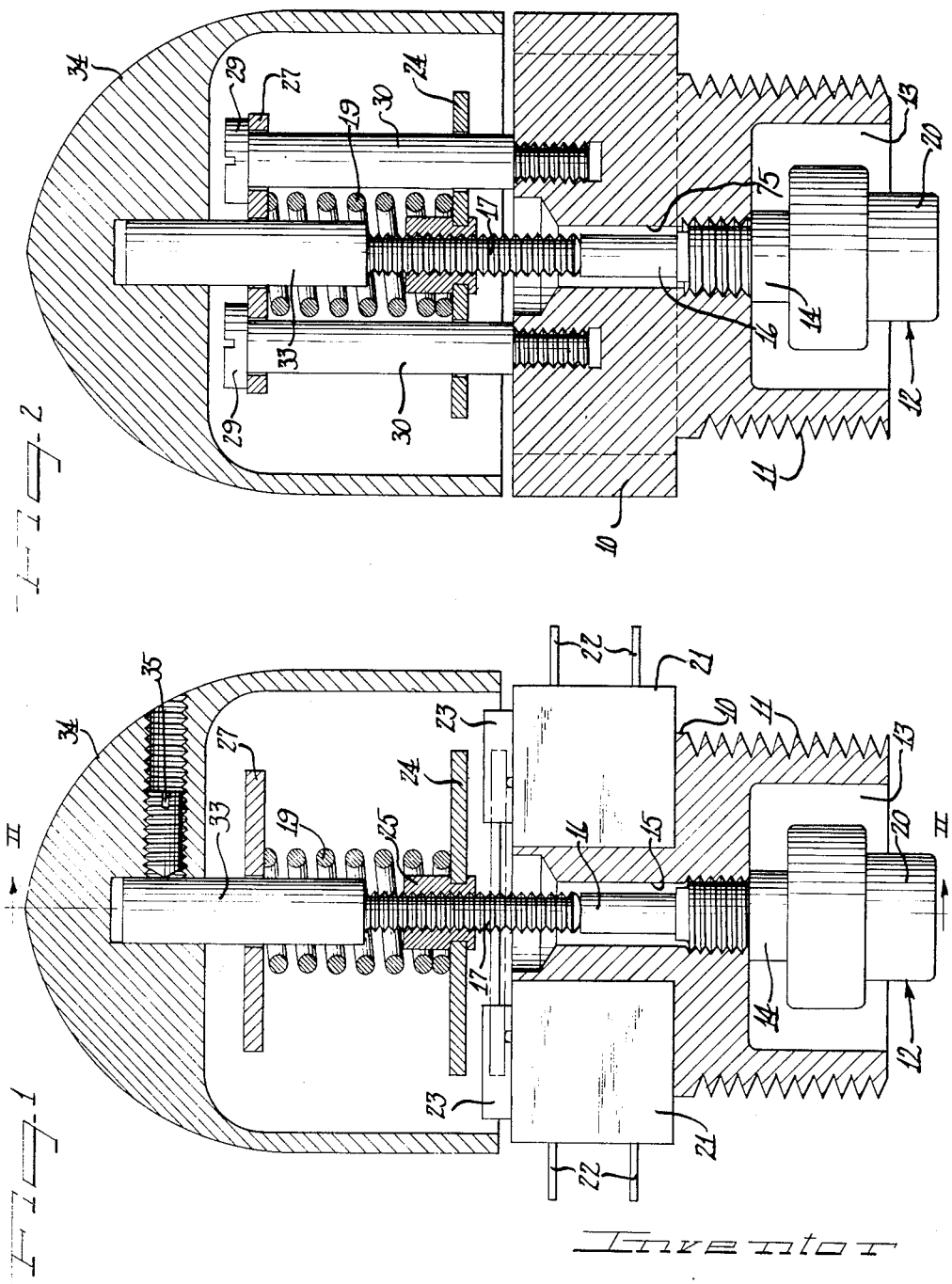
Inventor
Samuel G. Eskin

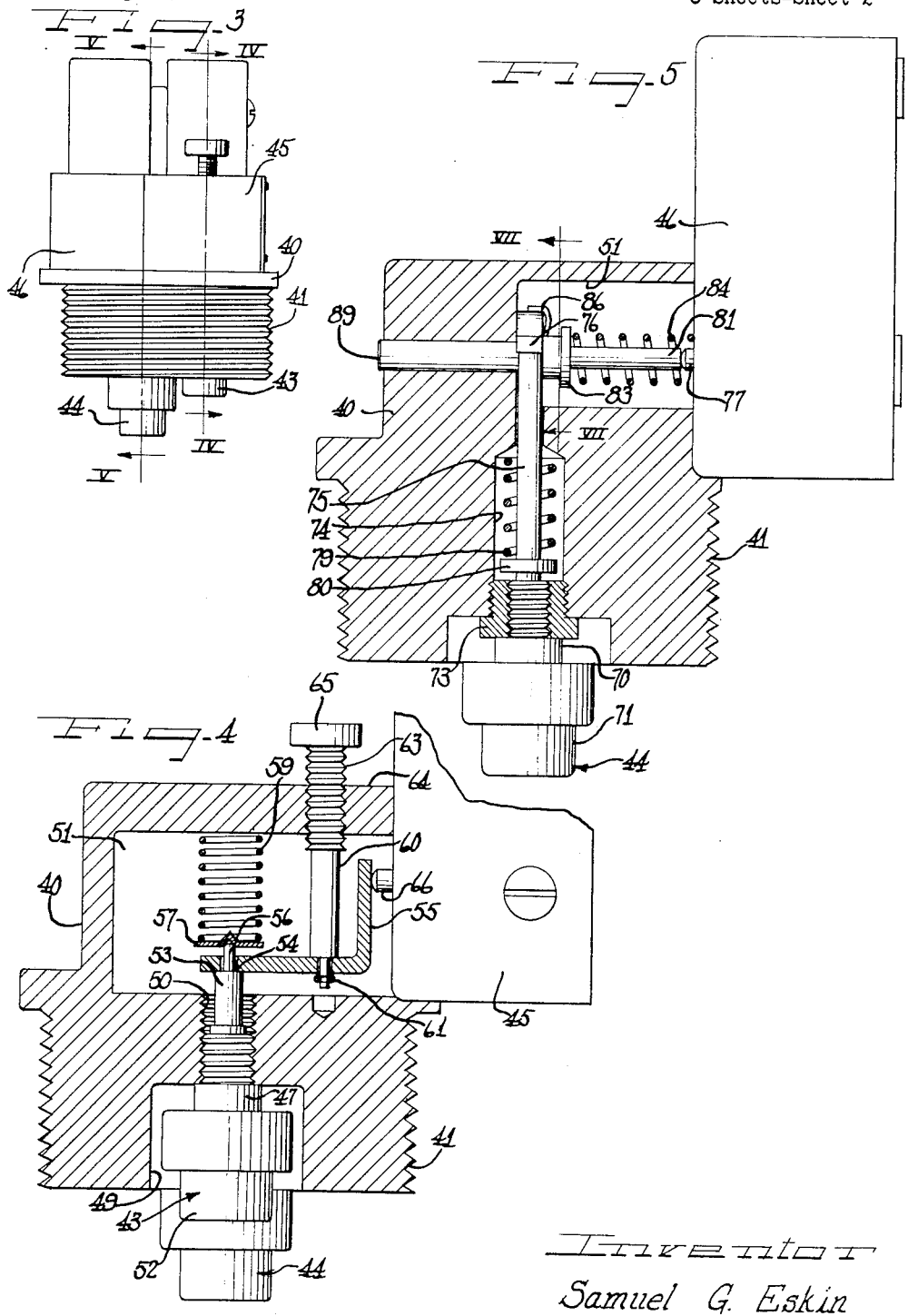

June 21, 1955  S. G. ESKIN  2,711,458
THERMOSTATICALLY OPERATED SHUT-OFF MEANS
Filed Aug. 3, 1953  3 Sheets-Sheet 3
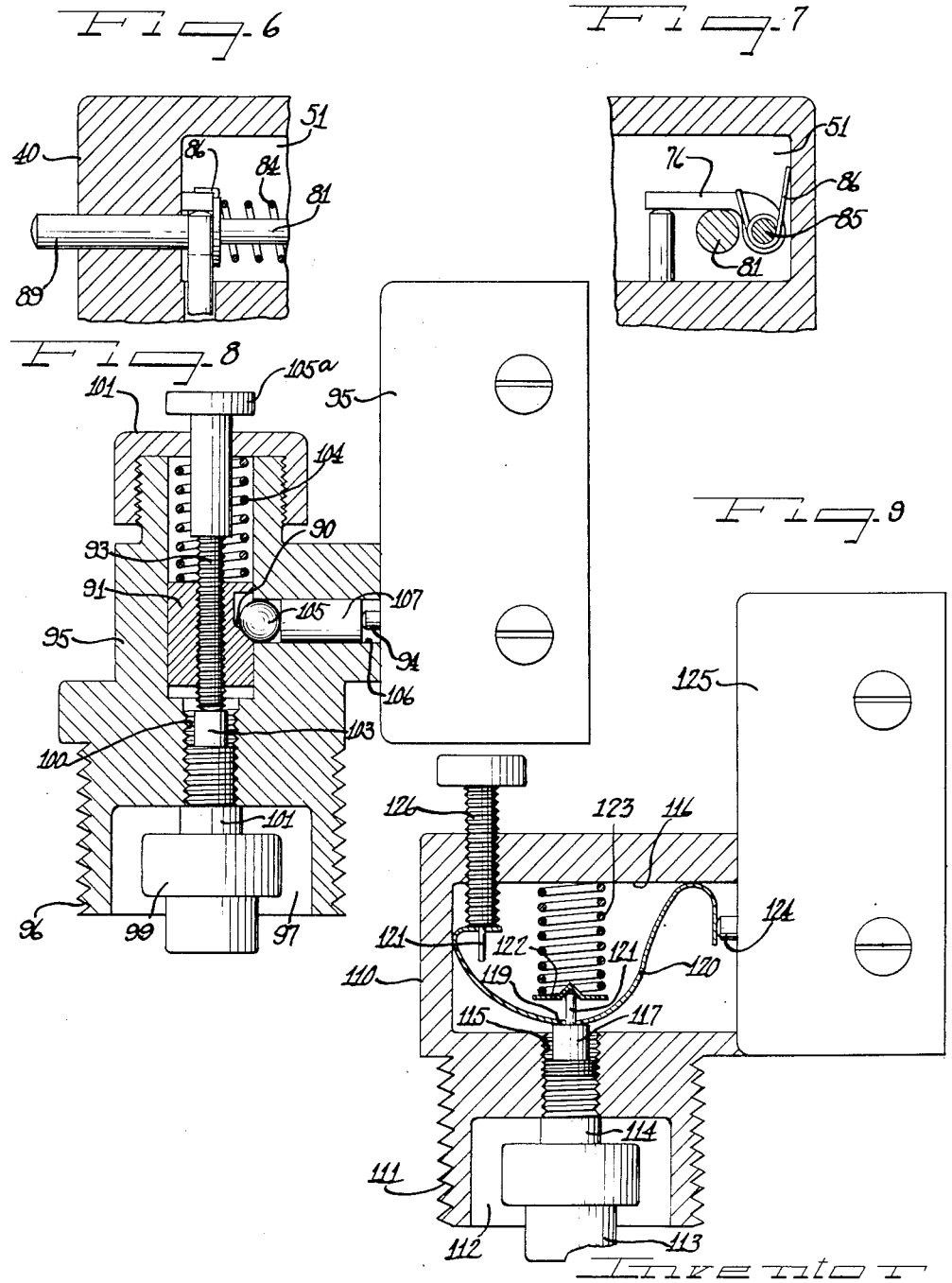

United States Patent Office 2,711,458
Patented June 21, 1955

2,711,458

THERMOSTATICALLY OPERATED SHUT-OFF MEANS

Samuel G. Eskin, Chicago, Ill., assignor to The Dole Valve Company, Chicago, Ill., a corporation of Illinois Application August 3, 1953, Serial No. 371,990

14 Claims. (Cl. 200—140)

This invention relates to improvements in thermostatically operated control devices and more particularly relates to such devices adapted to act as thermostatic and over-temperature safety shut-offs.

A principal object of my invention is to provide a simple and positively acting thermostatically operated device, for shutting off a flow of current at the temperature for which the device is set.

A further object of my invention is to provide a more efficient positively acting safety device particularly adapted for hot water heaters in which a power type thermostatic element is utilized to cut off the supply of current to the heater.

Still another object of my invention is to provide a safety device controlling the supply of electric power to an electrically heated hot water heater, utilizing a plurality of compact power type thermostatic elements having casings containing a thermally expansible material, in which the casings of the thermostatic elements may be immersed directly in the water being heated, one acting as a thermostat and the other shutting off the flow of current upon predetermined over-temperature conditions, and preventing the temperature of the water from reaching its boiling point.

Still another object of my invention is to provide a simpler form of thermostatically operating device than formerly, in which a metallic body having the casing of a power-type thermostatic element on the outside thereof and a plunger extensible from said casing may be strapped to the outside of a device containing a medium being heated, or may be threaded within the device, for the operation of electric switching means controlling the supply of power to the heating means for the device.

Still another object of my invention is to provide a thermostatically operated operating member particularly adapted for hot water heaters, and so arranged as to be of a smaller over-all size than former thermostatically operated operating devices, and to positively act with more power than former devices of the same general class.

Another and important object of my invention is to provide a thermostatically operated control device for controlling the supply of current to a hot water heater in which the thermostatic element may be directly immersed in the water being heated, and in which the usual low power and short travel Invar rod has been superseded by a relatively small size positively acting relatively long travel power-type thermostatic element.

These and other objects of my invention will appear from time to time as the following specification proceeds and with reference to the accompanying drawings wherein:

Figure 1 is a sectional view taken through a thermostatically operated electric shut-off device constructed in accordance with my invention;

Figure 2 is a sectional view looking substantially along line II—II of Figure 1;

Figure 3 is a view in side elevation of a thermostat and over-temperature shut-off device constructed in accordance with my invention;

Figure 4 is a sectional view taken substantially along line IV—IV of Figure 3;

Figure 5 is a fragmentary sectional view taken substantially along line V—V of Figure 3;

Figure 6 is an enlarged detail fragmentary sectional view of the shut-off device shown in Figure 3, showing the latch in a released position;

Figure 7 is a fragmentary sectional view taken substantially along line VII—VII of Figure 5;

Figure 8 is a sectional view taken through a modified form of operating device constructed in accordance with my invention; and Figure 9 is a sectional view taken through still another modified form of operating device constructed in accordance with my invention.

In the embodiment of my invention illustrated in Figures 1 and 2 of the drawings, I have shown a body 10 having a boss 11, shown as being threaded and having a thermostatic element 12 partially recessed therein and extending therefrom. The boss 11 may be threaded within the wall of a device containing a medium to be heated, such as the wall of a hot water heater to immerse the thermostatic element 12 in the medium being heated.

It should here be understood that while the boss 11 is threaded, to be threaded within the wall of a hot water heater or container for a medium being heated, to immerse the thermostatic element in the water or medium being heated, that the body need not be threaded and may be strapped to the wall of a container, with the thermostatic element 12 closely adjacent to, or in contact with the wall thereof.

The thermostatic element 12 is shown as being of a so called power type of thermostatic element, partially recessed within a recessed chamber 13, extending along the threaded boss 11 for a portion of its length and having a cylinder 14 threaded within a passageway 15 extending along the body 10. A piston or plunger 16 is shown as being extensible along a passageway 15 into engagement with the axially aligned end of a threaded plunger 17, for operating the same against the bias of a spring 19. The spring 19 also serves as a return spring for the piston or plunger 16. The thermostatic element 12 also includes a casing 20 extending outwardly from the cylinder 14, which may contain a thermally expansible material of a type such as is shown and described in Patent No. 2,259,846 which issued to Sergius Vernet on October 21, 1941. The thermostatic element 12 is of the same general type as shown and described in the Vernet Patent No. 2,368,181, dated January 30, 1945 and is commonly known as a "Vernay" thermostatic element. With such elements, the thermally expansible material carried within the casing 20 for the thermostatic element acts against a membrane or deformable member (not shown) as it expands to extend the piston 16 from the cylinder 14 upon predetermined rises in temperature. The particular utility of the form of thermostatic element shown is the positive action of the element having far more power than other thermostatic elements and a relatively long piston or plunger travel, together with the compact over-all size of the element in comparison with other known thermostatic elements.

The body 10 is likewise shown as having two switches 21, 21 partially recessed therein, having contacts 22, 22, which may be connected with a source of power and a device to be operated. The switches 21, 21 may be well known forms of micro or limit switches, so need not be shown or described in detail herein. Each switch 21 is shown as having a depressible button 23 which may be depressed to make or break an electric circuit, as desired. A switch operating member or disk 24 is shown as being carried on the threaded rod or plunger 17 for depressing or releasing the buttons 23, 23.

As herein shown, the disk 24 is mounted on a collar 25, threaded on the rod 17. The disk 24 may be mounted on a reduced diameter portion of the collar and the collar may be spun over the disk to engage the underside thereof and secure said disk thereto.

The compression spring 19 is shown as abutting the underside of a stationary disk 27 abutting the heads 29, 29 of two spaced guide pins 30, 30, having the operating disk 24 guided for slidable movement therealong and threaded within the body 10. The disk 27 is retained in engagement with the heads 29, 29 of the guide pins 30, 30 by the spring 19 and forms a reaction means for said spring to effect the biasing of the operating disk 24 in a direction to depress the buttons 23, 23 and open or close the switches 21, 21 as required. The threaded rod 17 has an upper enlarged diameter cylindrical portion 33, upon which is mounted a closure member or cap 34, in the form of an adjusting knob. The cap or knob 34 is shown as being secured to the cylindrical portion 33 of the rod 17 as by a set screw 35. Turning of the knob 34 in one direction or another will thus effect movement of the collar 25 and disk 24 along the threaded rod 17, to adjust the position of the operating disk 24 with respect to the reaction disk 27.

It may be seen from the foregoing that when the thermostatic element 12 is in contact with or in association with a medium being heated, and the temperature of the medium, which may be water, rises to the temperature for which the thermostatic element is set, that the plunger 16 extending from the cylinder 14 coming into engagement with the adjacent end of the threaded rod 17 will move the rod 17, disk 24 and cap or knob 34 against the bias of the spring 19 and to disengage the operating disk from the buttons 23, 23. This will release the respective switches 21, 21, to move to open or closed positions in accordance with the setting of said switches, it being understood that where the device is to control the supply of electric power to energize the heating element of a hot water heater that the switches move to open positions upon disengagement of the disk 24 from the buttons 23, 23 thereof.

As long as the temperature remains at the setting of the thermostatic element 12 and disk 24, the circuits through the switches 21, 21 will be open, the plunger 16 positively holding the disk 24 out of engagement with the buttons 23, 23 until a reduction in temperature occurs, due to deenergization of the heating elment, which is sufficient to enable the spring 19 to retractably move the plunger 16 within the cylinder 14.

In Figures 3 through 7, I have shown my invention as applied to a thermostat and over-temperature shut-off. In this form of my invention, I have shown a body 40 which may be made of metal such as brass, and which is shown as having a relatively large diameter threaded boss 41 extending therefrom within which are mounted two thermostatic elements 43 and 44. The thermostatic elements 43 and 44 are like the thermostatic element 12 shown in Figures 1 and 2, the thermostatic element 43 acting as a thermostat to open a switch 45 when the temperature of the medium being heated reaches the temperature for which the thermostatic element 43 is set to operate, and the thermostatic element 44 being set to operate at a higher temperature and shut off an associated switch 46 upon over-temperature conditions.

As shown in Figure 4, the thermostatic element 43 has a cylinder 47 recessed within a recess 49 formed in the boss 41 and threaded in said boss in communication with a passageway 50 extending therealong and opening into a chamber 51. The thermostatic element 43 also has a casing 52 on the outside of the boss 41 and a plunger or piston 53 extensible from the cylinder 47 along the passageway 50 upon expansion of the thermal responsive material carried within the casing 52, as the temperature to which the thermostatic element 43 is subjected rises. The plunger 53 is shown as having a shoulder 54 abutting the lower end of a lever 55, and an integral pin 56 extending from said shoulder and through said lever, into engagement with a seating member 57. The seating member 57 forms a seat for the lower end of a compression spring 59. The opposite end of the compression spring 59 from the member 57 is seated against the wall of the chamber 51.

The lever 55 is shown as being in a general form of a bell crank with the two arms thereof at substantially right angles with respect thereto. The lever 55 is pivotally carried on its horizontal lever arm on the lower end of an adjusting and reaction pin 60. As herein shown, a reduced diameter depending end of the reaction pin 60 extends through the horizontal arm of the lever 55 and the shouldered portion of said pin reacts against said lever and forms a fulcrum therefor. A snap ring 61 engaging the lower end of the reduced diameter portion of the pin 60 is provided to hold the lever 55 in position on the pin 60. The pin 60 in turn is threaded adjacent its upper end, as indicated by reference character 63. The threaded portion of the pin 60 is shown as being threaded within a wall 64 of the body 40, and as having a knob 65 on the outer end thereof, affording a means for turning said screw and varying the temperature at which the lever 55 will be operated by the plunger 53, to open the switch 45.

The switch 45 may be a well known form of limit or micro switch having a plunger 66 extending from the casing thereof within the chamber 51, and shown as being engaged at its end by the vertical arm of the lever 55.

It should here be understood that since the plunger 53 of the thermostatic element 43 moves a predetermined distance for each degree of temperature rise, that the farther away the fulcrum point of the lever 55 is from the end of the plunger 53 when said plunger is in a retracted position, that the higher will be the temperature at which the lever 55 will depress the plunger 66 of the switch 45.

The over-temperature thermostatic element 44 is shown as having a cylinder 70 extending from a casing of the thermostatic element. The cylinder 70 is shown as being threaded within a threaded adapter 73. The adapter 73 in turn is threaded within a passageway 74 extending along the boss 41 and having communication with the chamber 51. The cylinder 70 is shown as having a piston or plunger 75 extensible therefrom, upon expansion of the thermally responsive material carried within the casing 71, for engagement with a latch 76, to release said latch and release a plunger 77 of the switch 46, and accommodate said switch to open. The plunger 75 is retractably moved within the cylinder 70 upon a drop in temperature by a return spring 79 seated at its upper end within a reduced diameter portion of the passageway 74 and at its lower end against a collar 80 on the plunger 75.

The plunger 77 of the switch 46 is shown as being held in a depressed position by a release plunger 81, latched to hold the plunger 77 depressed by means of the latch arm 76. As herein shown, the release plunger 81 has a flanged collar 83 thereon adjacent the latch 76, which is biased in a release direction and into engagement with the latch 76 by means of a compression spring 84. The spring 84 is interposed between the casing for the switch 46 and the flange of the collar 83. The release plunger 81 is slidably guided in the wall of the body 40 and extends outwardly therefrom and has an outer end portion 89 forming a reset button or pin, to enable the release plunger 81 to be manually depressed and accommodate the latch to engage the opposite end face of the collar 83 from spring 84, and hold the plunger 77 of the switch 46 in a depressed position.

As shown in Figure 7, the latch 76 is pivotally mounted on a pivot pin 85 and is biased into engagement with the release plunger 81 to engage the adjacent end face of the collar 83 by means of a torsion spring 86. The torsion spring 86 is shown as abutting a side wall of the chamber 51 at one of its ends and as engaging the latch 76 at its opposite end.

It may be understood from the foregoing that upon over-temperature conditions, as the plunger 75 is extended from its cylinder 70 by expansion of the thermal-responsive material carried within the casing 71, that the latch 76 will be pivotally moved in a direction against the torsion spring 86. This will release said latch from the collar 83 and accommodate the spring 84 to move the release plunger 81 to the right, and relieve pressure from the switch plunger 77. As long as the over-temperature conditions are present, the plunger 75 will remain in its extended position and prevent the release plunger 81 from remaining in position to depress the button 77 of the switch 46 upon operation of the reset pin by the hand, and removal of the hand or finger therefrom. Upon a predetermined drop in temperature, however, the return spring 79 will retractably move the plunger 75 within the cylinder 70. The reset pin 89 may then be depressed, to depress the plunger 77 of the switch 46. As said reset pin is depressed, the torsion spring 86 will move the latch 76 into engagement with the periphery of the plunger 81, and position said latch to be engaged by the adjacent face of the collar 83, to hold the reset pin 89 and plunger 81 in a retracted position.

In the form of my invention shown in Figure 8, I have shown a cam face 90 recessed within a cam member 91 threaded on a plunger 93 for depressing a button 94 of a switch 95. In this form of my invention, I have shown a body of switch 95 having a threaded boss 96 extending from one end thereof and having a recess 97 extending within the end of said boss, to receive a thermostatic element 99. The thermostatic element 99 is a power type of thermostatic element like the thermostatic elements 12, 43 and 44 previously referred to, and is threaded within a passageway 100 extending along the boss 96, on a cylinder 101 of the thermostatic element. A piston or plunger 103 is shown as being extensible from the cylinder 101 into engagement with the end of the plunger 93, for moving said plunger against a return spring 104 to depress the switch 94.

As herein shown, the recessed cam face 90 in the cam member 91 has engagement with a ball 105 movable along a transverse passageway 106 in axial alignment with the button or plunger 94 of the switch 95. A cylinder 107 is shown as being interposed between the ball 105 and the button 94 to depress said button upon extension of the plunger 103 from the cylinder 101 and movement of the cam member 91 along the passageway. The cam member 91 may be of a rectangular form, as may be the passageway along which said cam member is movable, to prevent rotation of said cam member upon turning movement of the plunger 93, and effect adjustment of the thermostatic element and vary the temperature at which the button 94 is depressed. As herein shown, a knob 105a is provided on the outer end of the plunger 93 to turn the same. Said knob may be calibrated as may be an end cap 101 for the body 95, to enable the setting of the thermostatic element to be readily determined.

In the form of my invention shown in Figure 9, I have shown a body 110 like the body 13 and having a threaded boss 111 extending therefore, having a hollow or recessed end portion 112 for receiving a thermostatic element 113. The thermostatic element 113 is a power type of thermostatic element like the thermostatic elements referred to in the previously mentioned forms of my invention, and includes the usual cylinder 114 threaded within a passageway 115 extending along the boss 111, and opening into a chamber 116 formed in the body 110. A piston or plunger 117 is shown as being extensible from the cylinder 114 and as having a shoulder 119 abutting a leaf spring 120 intermediate the ends thereof. As herein shown, the plunger 117 has a reduced diameter pin 121 extending from the shoulder thereof through the spring 120 into engagement with a seating member 122. The seating member 122 forms a seat for return spring 123, for returning the plunger 117 within the cylinder 114 upon a predetermined reduction in temperature.

The leaf spring 120 is herein shown as being of a generally S-shaped form. One end of said spring abuts a button or plunger 124 of a switch 125, which may be a limit or micro-switch of a well known form, so is not herein shown or described in detail.

The opposite end of the leaf spring 120 is shown as being inturned and as extending through a depending reduced diameter end 121 of an adjusting screw 126, threaded in the wall of the body 110 and extending within the chamber 116. The inturned end of the leaf spring 120 is shown as abutting the bottom of the adjusting screw 126, so that changes in position of said adjusting screw may vary the temperature at which the plunger or piston 117 of the thermostatic element 113 will extend said spring along the chamber 116 to depress the plunger 124, and open or close the switch 125 in accordance with the setting of said switch and as conditions may require.

It will be understood that modifications and variations may of the present invention be effected without departing from the spirit and scope of the novel concepts thereof.

I claim as my invention:

1. In a thermally operated electric switching means, a body having an electric switch mounted thereon, said switch having a depressible operating button extending therefrom, an operating member engageable with said button to operate said switch, a spring biasing said member in a direction to operate said switch, a plunger guided for movement along said body for moving said operating member against its spring bias in a direction to release said switch button, a cylinder secured to said body and having said plunger guided for extensible movement therefrom, said cylinder and plunger being the cylinder and plunger of a thermostatic element and having a casing containing a thermally responsive material extending outwardly therefrom in direct association therewith, and said biasing spring for said switch operating member also being a return spring for said plunger.

2. In a thermally operated electric switching means, a body having an electric switching member mounted thereon, said switching member having a depressible button extending therefrom, an operating member for said button comprising a disk guided for movement toward and from said switch, an adjusting screw having threaded connection with said disk, a plunger guided in axial alignment with said adjusting screw for engagement with the end thereof, to disengage said disk from said switch button upon extensible movement of said plunger, a cylinder forming a guide for said plunger, said cylinder being the cylinder of a power type thermostatic element having a casing containing a thermally-responsive material in association with said cylinder on the outside of said body.

3. In a thermally operated electric switching means, a body having an electric switch mounted thereon, said switch member having a depressible operating button extending therefrom, an operating member engageable with said button to operate the same and comprising a disk guided for movement toward and from said button and held from turning movement with respect thereto, an adjusting screw having threaded connection with said disk and operable to extend said disk along said screw, a plunger guided in said body for engagement with the end of said adjusting screw, said plunger being the plunger of a power type thermostatic element having a cylinder secured to said body and a casing in association therewith and extending therefrom on the outside of said body and containing a thermally-responsive material, and spring means biasing said adjusting screw into engagement with said plunger and serving as a return spring for said plunger.

4. In a thermally operated electric switching means, a body having an electric switching member mounted thereon, said switching member having a depressible operating button for operating the same upon depression thereof, an operating member for said button comprising a disk guided for movement toward and from said button and held from turning movement with respect thereto, an adjusting screw having threaded connection with said disk, a cylinder threaded in said body on the opposite end thereof from said disk, said cylinder being a cylinder of a power type thermostatic element and having a casing in association therewith and extending outwardly therefrom and containing a thermally responsive material and also having a plunger extensible therefrom into engagement with the end of said adjusting screw, a spring biasing said adjusting screw into engagement with said plunger and forming a return spring for said plunger, a cover for said operating member, adjusting screw and switch button, said cover being in the form of a hollow knob secured to said adjusting screw to effect turning thereof to vary the temperature of operation of said disk.

5. In a thermally operated electric switching means, a switch having a depressible operating button, a body having said switch mounted thereon, said body having a passageway extending therealong, a cylinder extending within said passageway and secured thereto, said cylinder being a cylinder of a power type thermostatic element and having a casing in association therewith on the outside of said body and containing a thermally-responsive material and also having a piston slidably guided therein and extended therefrom upon expansion of said thermally-responsive material, two spaced guide pins secured to said body and extending outwardly therefrom on the opposite side thereof from said cylinder and casing, an operating disk guided for movement along said guide pins toward and from said button, for engaging and disengaging the same, an adjusting screw having threaded connection with said disk and mounted thereon in axial alignment with said plunger, spring means engaging said adjusting screw with the end of said plunger and serving as a return spring for said plunger, and a cap for said adjusting screw, operating disk and switch, said cap being in the form of a hollow knob, and means securing said cap to said adjusting screw to move therewith upon switch opening and closing movement thereof, and to turn said screw to vary the position of said operating disk thereon and the temperature of switch operation.

6. In a thermostatically operated electric switching means, a hollow body opening to one side thereof, an electric switch extending across the open portion of said body and closing the same and having an operating button extending within the hollow portion of said body, a cylinder threaded within an end of said body, said cylinder being the cylinder of a thermostatic element and having a casing in association therewith and extending outwardly therefrom to the outside of said body and containing a thermally-responsive material, and also having a plunger slidably guided therein for extensible movement within the hollow portion of said body upon predetermined temperature rises, an operating lever for said switch movable to depress said button upon extension of said plunger, and a fulcrum point for said lever comprising an adjusting screw threaded within said body and having said lever rockingly mounted on the end thereof, and being adjustable toward and from said plunger to vary the temperature of operation of said lever.

7. In a thermostatically operated electric switching means, a hollow body, a passageway extending along said body into the hollow portion thereof, said body being open to one side of said passageway, an electric switch closing the open portion of said hollow body and having a depressible button extending within the hollow portion of said body, a cylinder extending along said passageway and secured thereto, said cylinder being the cylinder of a power type thermostatic element and having a casing in association therewith extending therefrom on the outside of said body and containing a thermally-responsive material and having a plunger extensible from said cylinder along said passageway within the hollow portion of said body upon predetermined temperature rises, a spring retractably moving said plunger within said cylinder, a bell crank engaged by said plunger at one end thereof and engaging said depressible button at the opposite end thereof, an adjustable fulcrum point for said bell crank, reacting thereagainst intermediate the ends thereof, comprising an adjusting screw threaded in said body and extending within the chamber thereof, and means connecting said bell crank to said adjusting screw and accommodating rocking movement thereof about said screw.

8. In a thermostatically operated electric switching means, a body having a chamber therein and opening to one side thereof, an electric switch closing the end of said chamber and having a depressible operating button extending within said chamber, a passageway extending along said body into said chamber, a release plunger for said button in axial alignment therewith and engageable with the end thereof, said plunger being slidably guided in said body and having an end portion extending outwardly therefrom and forming a reset therefor, a latch pivotally mounted within said chamber for engagement with said plunger to retain the same in engagement with said depressible button, a spring biasing said plunger in a direction away from said depressible button, and a power type thermostatic element secured to said body on the outside thereof including a cylinder extending partially along said passageway and secured thereto, a casing in association with said cylinder and extending outwardly therefrom and containing a thermally-responsive material, a piston extensible from said cylinder upon expansion of said thermally-responsive material, said piston being guided in alignment with said latch to engage the same and release said plunger to move to its spring biased position out of engagement with said depressible switch button, and a return spring retractably moving said piston within said cylinder upon predetermined drops in temperature.

9. In a thermostatically operated electric switching means, a body having a chamber therein and opening to one side thereof, a switch secured to said body and closing the open side thereof and having a depressible operating button extending within said body, a thermostatic element having a cylinder threaded within an end of said body and a casing extending outwardly therefrom in association with said cylinder and containing a thermally-responsive material, a plunger extensible from said cylinder within said body, an adjusting screw slidably guided for movement along said chamber, a spring biasing said adjusting screw in engagement with said plunger and forming a return spring for said plunger, an operating member threaded on said adjusting screw and held from rotation therewith, said operating member having a recessed cam therein, and a ball engageable with said cam and moved laterally with respect thereto upon movement of said operating member and adjusting screw along said chamber effected by extensible movement of said plunger from said cylinder.

10. In a thermostatically operated electic switching means, a body having a passageway extending therealong and opening to each end thereof, a second passageway extending from said first mentioned passageway at right angles with respect thereto and opening to one side of said body, a switch secured to said body and having a depressible plunged extending within said second mentioned passageway, an operating member guided for movement along said first passageway and having a recessed cam in association with said second passageway, a ball in said second passageway engaging said cam, a cylinder interposed between said ball and depressible button for depressing the same upon movement of said operating member along said first passageway in one direction, an end closure cap for an end of said passageway, an adjusting screw slidably guided therein and having said operating member threaded thereon for adjusting the position thereof with respect to said adjusting screw upon turning movement thereof, a spring interposed between said end cap and operating member and biasing said operating member and cam to move in a direction to free said ball, and a power type thermostatic element closing the opposite end of said chamber from said end cap and having a cylinder threaded therein, a casing extending outwardly therefrom for immersion in the medium being heated and containing a thermally-responsive material, and a plunger extensible from said cylinder inwardly along said passageway upon expansion of said thermally-responsive material, effected by predetermined temperature rises.

11. In a thermostatically operated electric switching means, a body having a chamber therein opening to one side thereof, an electric switching member secured to said body and closing the open portion thereof, said switching member having a depressible button extending within said chamber, a passageway extending from an end of said body within said chamber at right angles with respect to said button, a thermostat secured to the end of said body in association with said passageway and including a cylinder extending within said passageway and secured thereto, a casing in association therewith and extending outwardly therefrom for immersion in a medium being heated and containing a thermally-responsive material, and a piston extensible from said cylinder within said chamber upon expansion of said thermally-responsive material effected by predetermined temperature rises, a return spring retractably moving said piston within said cylinder, and a yieldable member for depressibly moving said button upon extension of said piston within said chamber comprising a generally S-shaped resilient member engaged by said plunger intermediate its ends, engaging said button at one of its ends, and engaging an abutment member extending within said chamber at its opposite end.

12. In a thermally operated electric switching means, a body having an electric switch mounted thereon, said switch having a depressible operating button extending therefrom within said body, an operating member engageable with said button to operate said switch, a plunger guided for movement along said body, means operated by movement of said plunger along said body for actuating said operating member to operate said operating button of said switch, a cylinder secured to said body and having said plunger guided for extensible movement therefrom, said cylinder and plunger being the cylinder and plunger of a thermostatic element and having a casing containing a fusible thermally responsive material in direct association therewith and extending outwardly therefrom to the outside of said body, and a return spring for said plunger within said body having direct engagement therewith.

13. In a thermostatic operating device of the class described, a body having a chamber therein, a rectilinearly movable member to be operated extending within said body and chamber, a thermostatic element having a casing closing an end of said body and extending outwardly therefrom and containing a fusible thermally-responsive material, a power member extensible from said casing upon fusion of the fusible material contained therein, a plunger operated by said power member and guided for rectilinear movement in a direction at substantially right angles with respect to said rectilinearly movable member, a spring forming a return spring for said plunger and power member, and an angled drive connection from said plunger to said rectilinearly movable member for depressing the same upon extensible movement of said power member and plunger comprising a cam on said plunger having drive connection with said rectilinearly movable member.

14. In a thermostatically operated electric switching means, a body having a chamber therein and opening to one side thereof, a switch secured to said body and closing the open side thereof and having a depressible operating button extending within said body and chamber, a thermostatic element having a casing closing an end of said body at an angle to said switch and depressible operating button and extending outwardly from said body and containing a fusible thermally-responsive material for association with the medium being heated, a power member extensibly movable with respect to said casing upon predetermined increases in temperature and fusion of the fusible material contained therein, a plunger operated by said power member and movable along said chamber upon extensible movement of said power member with respect to said casing, a spring biasing said plunger into engagement with said power member and forming a return spring therefor, and an angled drive connection between said plunger and depressible operating button for operating the same upon extensible movement of said power member with respect to said casing.

References Cited in the file of this patent
UNITED STATES PATENTS

| | | |
|---|---|---|
| 2,445,625 | Meinholdt | July 20, 1948 |
| 2,460,762 | Minnich | Feb. 1, 1949 |
| 2,553,291 | Barr | May 15, 1951 |